April 3, 1928.  1,664,582

J. WALDES

FASTENER

Filed Sept. 20, 1924

INVENTOR
JINDRICH WALDES
BY
ATTORNEYS

Patented Apr. 3, 1928.

1,664,582

UNITED STATES PATENT OFFICE.

JINDŘICH WALDES, OF PRAGUE, CZECHOSLOVAKIA.

FASTENER.

Application filed September 20, 1924, Serial No. 738,738, and in Germany March 6, 1924.

My invention relates to fasteners and more particularly to that type which include a hollow main member constituting a holding device and exemplified, for instance, by the male member in fasteners of the glove fastener type; the latter, generally speaking, consist of two members adapted to be united by pressure and separated from each other by being pulled apart. The object of my invention is to provide a novel and simple device whereby the main member of the fastener may be secured in place upon predetermined material in a manner to avoid the necessity for noticeably perforating said material and to enable the position of said member on said material to be changed without leaving any specially visible traces of its initial location on the same. The invention will be fully described hereinafter and the features of novelty will be pointed out in the claims.

Figure 1:
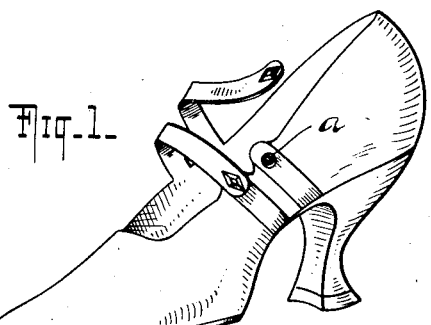
Figures 2, 3:
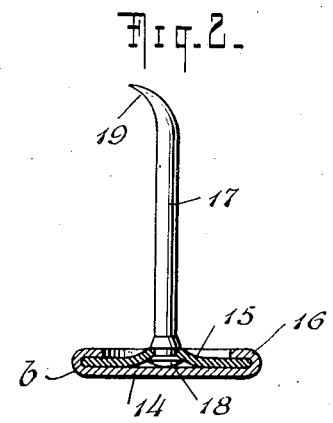
Figures 5, 6:
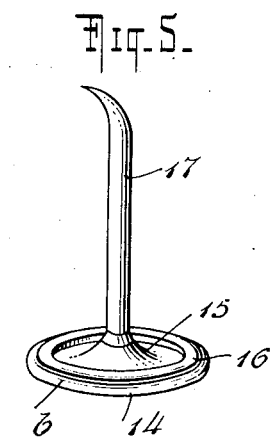
Figure 8:
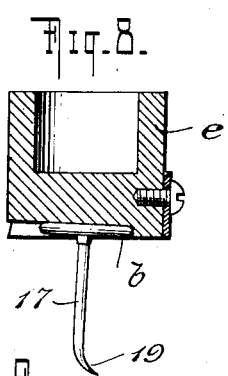
Figure 9:
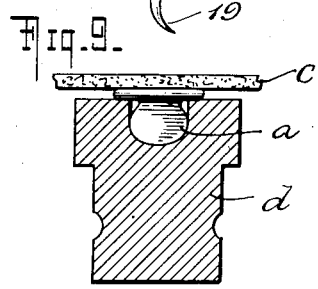
Figure 4:
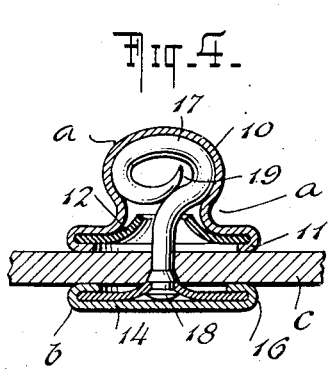
Figure 7:
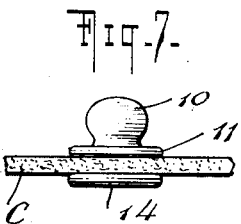

In the accompanying drawing, which shows an example of the invention without defining its limits, Fig. 1 is an elevation showing an application of the novel fastener; Fig. 2 is an elevation, partly in section, of the improved securing device which forms part of the invention; Fig. 3 is a sectional view of the main member of the fastener; Fig. 4 is a sectional view showing said main member of the fastener secured in place upon the material in accordance with my invention; Figs. 5 and 6 are perspective views of the securing device and the main member of the fastener respectively; Fig. 7 is a view of the fastener as it appears in place upon the material; and Figs. 8 and 9 are sectional views illustrating a means whereby the main member and securing device may be mechanically combined.

As shown in the illustrated example, the fastener comprises the customary main member $a$ provided with a hollow head 10, which itself may constitute a holding device, such as a shoe-button or the like or which may have an inherent resiliency and be suitably shaped for cooperation with another member as exemplified, for instance, by the customary female member of a fastener of the snap fastener type. As shown in Fig. 3, the head 10 is continued in the form of a transverse flange 11 which is crimped at its peripheral edge over an apertured guide plate 12 for fixing the latter in place, said guide plate converging inwardly, preferably along curved lines, as indicated at 13. The aperture in this guide plate 12 is, of course, of ample dimensions to admit into the interior of the hollow head 10 the bent-pointed pin, hereafter described, when said pin is forced into the hood in an axial direction. The fastening device $b$ whereby the main member $a$ is secured in place, consists of a head 14 in which a securing disc 15 is affixed, for instance by having the peripheral edge of the head 14 crimped thereon as indicated at 16. The disc 15 is provided with a pin, needle or other puncturing device 17, one end of which is secured to said disc 15, for instance by being riveted thereto as indicated at 18; the other or free end 19 of the pin or needle 17 is pointed and is bent or curved, for instance as shown in the drawings. The pin or needle 17, in its preferred form, is of approximately even diameter throughout its length up to the point which is bent out of the axial line of said needle as shown and the even diametered portion of said needle or pin is of materially smaller cross-section than that of the aperture in the guide plate 12.

In practice, the main member $a$ is placed in position with respect to the material $c$ to which it is to be attached, with its crimped edge in surface engagement therewith and with the head projecting perpendicularly from the surface of said material. The needle 17 of the device $b$ is then passed through the material $c$ by causing its point 19 to penetrate the same, it being understood that this penetration of the material takes place in registry with the point at which the fastening member 10 is located. As the point 19 comes into contact with the inwardly converging surface 13 of the guide plate 12 it will be diverted thereby to the interior of the head 10 and will finally come into engagement with the substantially spherical inner surface thereof. Because of the curved interior surface conformation of the head 10, assisted by the curved form of the point 19, the latter, as pressure upon the head 18 continues, will be forced along the interior surface of the head 10 and will finally be coiled or bent upon itself into approximately the form shown in Fig. 4. In this condition, approximately the entire interior surface of the head 10, along one vertical section of its diameter as shown in Fig. 4, is engaged by the looped part 17, and the entire hood is rigidified by such an engagement, the part 17 having, itself, been bent into more or less of a coil of spiral-like configuration which maintains and preserves the parts in the position shown in Fig. 4, whereby the fastening member 10 remains securely fixed upon the surface of the material c. It will be noted that the material c has been punctured only by the needle 17 and that the resulting puncture is consequently no larger than the diameter of the needle. If it becomes necessary, for any reason, to alter the position of the member a upon the material c, the head 10 of said member is simply cut off transversely by means of a suitable cutting instrument, such as an ordinary cutting pliers, at a point to sever the needle 17 whereupon the parts may be separated and disconnected from the material c. A new fastener may thereupon be secured to material c in the new location by means of a new fastening device in the manner previously set forth. The puncture resulting from the penetration of the first fastening device is practically unnoticeable and, in some cases, because of the inherent properties of the material c, will be caused to disappear almost entirely. In fasteners of the snap-fastener type, the male member of the fastener has heretofore been secured in place by means of eyelets which require the formation of holes of a considerable size in the material. A removal and relocation of such fasteners was therefore more or less impossible for the reason that the large openings which would remain in such case presented an objectionable appearance; furthermore, because of the absence of material within the confines of such relatively large openings, a re-adjustment of the fasteners to points within the limits of said openings could not be effected. As the relocation of said fasteners, generally speaking, requires only a slight shifting thereof, this is a serious disadvantage. With the present construction, no such objections exist, as the puncture made by the needle 17 is so small as to be practically invisible. In addition to this advantage, the invention presents the further advantages that the field of usefulness of fasteners of the snap fastener type is materially enlarged as the invention in question permits the use of these fasteners in many ways in which, heretofore, they have not been capable of satisfactory use. For instance, the novel method of securing the member a in place may be utilized in connection with footwear as shown by way of example in Fig. 1 and thus provides a novel fastening means for shoes and other coverings for the foot, as well as for numerous other articles such as gloves, wearing apparel, leather goods, corsets, etc. The nature of the fastening device is such that highly ornamental and novel effects may be produced; that is to say, if the head 10 is exposed to view, it may be made of unique form or it may be given a distinctive appearance by ornamenting and coloring the same or by providing both a distinctive form and a distinctive ornamentation or coloring thereon. In addition, the cooperating member, that is, the female member of the snap fastener, if the same is exposed to view, may be made in a large variety of shapes, such as squares, ovals, triangles, polygons, irregular designs, buckles, and other ornamental effects, and may be constructed of metal, celluloid, horn, mother of pearl, leather, rubber, fabrics decorated with enamel, stones, etc., or of any other suitable material. Furthermore, the fastener may be made in various sizes and may include any type of special spring secured in one element of the fastener or the metal of the latter may be cut in a predetermined manner to provide such spring, as is done at present in many existing types of snap fasteners.

The novel form of fastener makes it possible to utilize snap fasteners for shoes and enables the glove arrangement of fastening to be incorporated in shoes and other footwear; that is, with the present form of fastener, as shown in Fig. 1, shoes and other footwear may be closed in a novel manner along the centre line of the foot. Furthermore, footwear provided with the novel fastener, may be provided with glove effects by embroidering and otherwise, be laced, and may be either high or low as desired. With the illustrated and described fastener, new styles in shoes and other footwear may be created, not only from the standpoint of appearance but also from the standpoint of utility; that is to say, shoe designers may create shoes and other footwear of distinctively different appearance from any that are in existence at the present time.

In addition, the use of the herein described and illustrated fastener, when embodied in shoes and other footwear, facilitates the opening and closing thereof. With existing types of footwear, which include buttons and button holes as the fastening means, it is necessary to use a buttonhook, hairpins, or other equivalent devices to button and unbutton the same and considerable light is required in order to enable the operations, particularly of buttoning, to be properly performed. None of the implements indicated above are required to fasten and unfasten shoes equipped with the novel fastener described herein. Furthermore, the use of the latter eliminates the necessity for the manufacture of buttonholes, although in some cases the fastener may be used in conjunction with buttonholes, somewhat in the manner in which cuff links at the present time are used for the sleeves of soft shirts; that is, the male member of the fastener may be firmly attached to the shoe as hereinbefore set forth, and the cooperating female member may be combined with the buttonhole and connected with the male member as desired.

In carrying out the scheme, the further possibility exists that the female part of the fastener may be exchanged at will without requiring any cumbersome tools and a new idea in shoe setting may thus be created. That is, the shoes may be on sale equipped with the male member of the snap fastener and the female member may be chosen by the customer for cooperation therewith and changed as often as desired.

To still further facilitate connection and disconnection of the snap fasteners, the top of the female section thereof may be made of oval shape or in the form of an otherwise elongated plate, decorated or covered, which will fit all shoes with straps or any other kind of shoes. Such plate because of its form and extended area will provide an increased leverage whereby disengagement of the fastener elements is easily effected and at the same time will reduce the danger of tearing out of the fastener from the material as a force is exerted to separate the same.

It will be understood that the character of the needle 17 may be otherwise than as illustrated and may for instance be replaced by a double needle or the like. The term "needle" as used herein is used in a sense to designate a puncturing or penetrating member and is intended to be representative of devices such as pins, nails, or the like.

In any case the needle 17 is made of standard dimensions which will meet the requirements of all uses as the length of said needle 17 is sufficient for any thickness of all materials in connection with which the fasteners are likely to be used. The loop will simply become larger or smaller and, therefore, one standard sized needle will cover all requirements. In every case, whether the loop is larger or smaller, the plate 12 and the relatively small aperture 13 thereof, will securely hold the coil or loop within the fastener element $a$ notwithstanding the fact that the cross-section of the straight pin portion at its level nearest the pin-admitting aperture is materially smaller than that of said aperture. In fact this very feature renders the structure capable of use in connection with fabrics of different thicknesses. In no position of the needle with respect to the plate 12, whether the needle be coiled to a greater or to a lesser extent within the hood $a$, will any part of the straight portions of the pin ever be restrained or jammed against any movement-limiting part of the hood member or of its associated parts. In other words, the arrangement is such that the straight part of the pin, whatever may be the final position of association as between the pin and the hood, will be relatively free from and unsupported by any other part of the hood member than that which is in contact with the coiled part of the pin. The loop formed by the needle in the main member $a$ will strengthen this main member and, therefore, the latter can be made from very thin material such as brass, iron, etc. The needle 17 should be made of material sufficiently rigid to resist collapse at any point between its ends when under pressure of the dies $d$ and $e$, although sufficiently pliable to coil over readily at the pointed end.

In addition to the above, the invention greatly simplifies the operation of fastening the main member in place and reduces this operation to the simplest form. Any suitable means may be utilized for fastening the member $a$ in place; for instance, as shown by way of example in Figs. 8 and 9 of the drawings, the main member may be mounted in position in a suitable die $d$ and the head 10 of the fastening device in a cooperating die $e$, said dies being brought together in the operation of uniting the elements $a$ and $b$. In order to facilitate the penetration of the material the fastening device in such case may be mounted in the die $e$, preferably so that the needle 17 is inclined in a lengthwise direction with respect to the direction of movement of the die $e$. It will be understood that, in operation, the material $c$ is placed over the member 10 after the latter has been mounted in the die $d$, after which the die $e$, with the fastening device affixed therein, is lowered to cause the point 19 to penetrate said material and to deform the needle in the head 10 by a continued actuation of the die $e$. It will be understood that the die $e$ will be operated under sufficient pressure to securely fasten the fastening device of the fastening member together in the indicated manner. This can be done by hand power, as there is less force required to perform this operation than would be needed in the case of rivets and it is thus possible, and in fact, the preferred practice, to mount the dies $d$ and $e$ in a toggle-jointed, hand operated plier tool of conventional construction. If desired, the die $d$ may be the movable die or, in some cases, both dies may be caused to approach each other.

The illustrated example of the means for fastening the members $a$ and $b$ in place is intended to be representative only and said means may be replaced by other suitable devices. It will be observed that this invention makes it possible and easy, without employing specially trained or skilled labor or operators of special experience or power, to remove and to relocate the fastener elements $a$ anywhere on the article on which the cooperating fastener element is situated, all without loss of appreciable time so that any re-adjustment can be made while the customer is waiting, e. g., in a shoe store while the customer is trying on shoes.

Various changes in the specific form shown and described may be made within the scope of the claims without departing from the spirit of my invention.

I claim:

1. In combination with a carrying material a fastener of the type described, comprising a hood element bearing against one face of said material and having a pin-admitting aperture and a hollow interior, comprising arched top and arched sides merging into a smooth surface having a gently changing curvature throughout and being free from abrupt changes in curvature, a pin member having a head bearing against the other face of said material, and having a straight pin portion of materially smaller cross-section at its level nearest the pin-admitting aperture than that of said aperture, and having a bent portion formed into a coil within the hood, the parts of said pin located within the hood being smoothly coiled out of the axial line of the pin in opposite directions therefrom, said coil operating as a fixed, locked tension control agent for the carrying material, the lower faces of said agent fitting with snug surface-engagement against the lower faces of the arched sides of the hood interior at opposite sides of the axial line of the pin while the upper face of said agent fits with snug surface engagement against the arched top of the hood interior, said coil making rigid the hood structure by making continuous uninterrupted contact between the outer surface of the coil and the inner surface of the hood, said continuous contact beginning from a point to one side of the pin axis, lower than the wide portion of the side arch of the hood interior and extending, continuously in contact with the inner surface of the hood, to a point lower than such wide portion of the side arch of the hood interior as faces an opposed part of the pin axis, the coil being of such character as results from initially introducing a relatively long pin having its point initially bent to one side, through the carrying material, into contact with the arched top of the hood interior and then applying pressure between the pin head and the hood until the carrying material is tightly clamped therebetween.

2. A fastening element adapted to be transformed into a coil when introduced forcibly and in a substantially axial direction through a carrying material and then into a hood member which has an interior arched contact surface and a pin-admitting aperture, said element being constituted of an enlarged head and of a relatively long pin portion of substantially uniform, untapered cross-section throughout its major extent, and terminating in a relatively short stocky point extending laterally from the untapered pin portion, said untapered pin portion being of materially smaller cross-section throughout than that of the aperture of the hood member with which the pin member is adapted to co-operate, the length of the untapered pin portion and the inclination of the point therefrom being such that when the bent-pointed pin is forced through fabric carrying material and its bent point is then pressed against the arched inner surface of the hood member by pressure applied substantially axial with the pin, the pointed tip forms a smooth coil within said hood member, the coil embodying a large part of the untapered portion of the pin, the coil seating itself in continuous surface contact with the inner walls of the hood and having a spiral-like configuration, maintaining and preserving contact between the surfaces of the outermost portion of the coil and the inner surface of the hood from a point below the widest part of the hood and continuously along the inner surface of the hood to an opposed point below the widest part of the hood, the axis of the pin being intermediate between said points.

3. In combination with a carrying material a fastener of the type described comprising a hood element bearing against one face of said material and having a hollow interior, comprising arched top and arched sides merging into a continuous curved surface having a gently changing curvature throughout and being free from abrupt changes in curvature, a pin member, a guide plate positioned at the open end of said hood element, an apertured inside guide plate of sufficient dimensions to permit the passage therethrough, in an axial direction, of the pin member when its point is bent to one side before the pin member is inserted through the carrying material and through the guide plate into the hood interior, the said pin member having a head bearing against the other face of said material, and having a pin portion formed into a coil within the hood, the parts of said pin located within the hood being smoothly coiled out of the axial line of the pin in opposite directions therefrom, said coil operating as a fixed, locked tension control agent for the carrying material, the lower faces of said agent fitting with snug surface-engagement against the lower faces of the arched sides of the hood interior at opposite sides of the axial line of the pin while the upper face of said agent fits with snug surface engagement against the arched top of the hood interior, said coil rigidifying the hood structure by making continuous uninterrupted contact between the outer surface of the coil and the inner surface of the hood, said continuous contact beginning from a point to one side of the pin axis, lower than the wide portion of the side arch of the hood interior and extending, continuously in contact with the inner surface of the hood, to a point lower than such wide portion of the side arch of the hood interior as faces an opposed part of the pin axis, the coil being of such character as results from initially introducing a relatively long pin having its point initially bent to one side, through the carrying material, through the apertured guide plate, and into contact with the arched top of the hood interior and then applying pressure between the pin head and the hood until the carrying material is tightly clamped therebetween.

4. Carrying material combined with fastener elements as set forth in claim 3 in which the apertured guide plate is secured in position in association with the hood member by confinement of its peripheral portion between bent-over clamped edge portions of the hood element.

5. In combination with a carrying material a fastener of the type described, comprising a hollow hood element bearing against one face of said material and having a pin-admitting aperture and a globular interior surface, a pin member having a head bearing against the other surface of said material and a straight portion of materially smaller cross-section at its level nearest the pin-admitting aperture than that of said aperture, and a coil integral with the pin tightly seated against the inner walls of the hood and having a spiral-like configuration, said coil maintaining and preserving contact between the surfaces of the outermost portion of the coil and the inner surface of the hood from a point below the widest part of the hood and continuously along the inner surface of the hood to an opposed point below the widest part of the hood, the axis and straight portion of the pin being intermediate between said points and said straight portion being at least for the major portion of its periphery out of contact with any part of the hood element.

In testimony whereof I have hereunto set my hand.

JINDŘICH WALDES.